(12) United States Patent
Krivcov et al.

(10) Patent No.: US 7,902,688 B2
(45) Date of Patent: Mar. 8, 2011

(54) VERTICAL AXIS WIND TURBINES

(75) Inventors: Vladimir Krivcov, Miass (RU);
Vladimir Krivospitski, Miass (RU);
Vasili Maksimov, Miass (RU); Richard Halstead, Rohnert Park, CA (US); Jurij Grahov, Miass (RU)

(73) Assignee: The Regents of the University of California, Oakland, CA (US)

( * ) Notice: Subject to any disclaimer, the term of this patent is extended or adjusted under 35 U.S.C. 154(b) by 18 days.

(21) Appl. No.: 11/937,370

(22) Filed: Nov. 8, 2007

(65) Prior Publication Data
US 2008/0253889 A1  Oct. 16, 2008

Related U.S. Application Data

(63) Continuation of application No. PCT/US2006/019326, filed on May 15, 2006.

(60) Provisional application No. 60/681,210, filed on May 13, 2005.

(51) Int. Cl.
*F03D 9/00* (2006.01)
*H02P 9/04* (2006.01)

(52) U.S. Cl. .......................... 290/55; 290/44

(58) Field of Classification Search .............. 290/44, 290/55; 416/132 B, 7, 111, 117, 119; 60/398; 415/2.1, 4.2, 4.5, 4.1, 905, 907, 908
See application file for complete search history.

(56) References Cited

U.S. PATENT DOCUMENTS

| | | | |
|---|---|---|---|
| 1,654,165 A | 12/1927 | Felt | |
| 4,095,422 A * | 6/1978 | Kurakake | 60/398 |
| 4,204,805 A | 5/1980 | Bolie | |
| 4,329,593 A | 5/1982 | Willmouth | |
| 4,447,738 A * | 5/1984 | Allison | 290/44 |
| 4,449,053 A * | 5/1984 | Kutcher | 290/44 |
| 4,500,257 A | 2/1985 | Sullivan | |
| 4,649,284 A * | 3/1987 | Hsech-Pen | 290/55 |
| 5,044,878 A * | 9/1991 | Wilhelm | 415/4.2 |
| 5,375,324 A | 12/1994 | Wallace | |
| 6,379,115 B1 * | 4/2002 | Hirai | 416/17 |
| 6,629,815 B2 * | 10/2003 | Lusk | 415/4.2 |
| 6,784,566 B2 | 8/2004 | Thomas | |
| 6,870,280 B2 | 3/2005 | Pechler | |

(Continued)

FOREIGN PATENT DOCUMENTS
CA 2531383 1/2005
(Continued)

OTHER PUBLICATIONS

International Search Report dated Jan. 5, 2007 for International Patent Application No. PCT/US2006/019326.
(Continued)

*Primary Examiner* — Julio Gonzalez
(74) *Attorney, Agent, or Firm* — Knobbe Martens Olson & Bear LLP

(57) ABSTRACT

A vertical axis wind turbine is described. The wind turbine can include a top ring, a middle ring and a lower ring, wherein a plurality of vertical airfoils are disposed between the rings. For example, three vertical airfoils can be attached between the upper ring and the middle ring. In addition, three more vertical airfoils can be attached between the lower ring and the middle ring. When wind contacts the vertically arranged airfoils the rings begin to spin. By connecting the rings to a center pole which spins an alternator, electricity can be generated from wind.

17 Claims, 11 Drawing Sheets

U.S. PATENT DOCUMENTS

| | | | |
|---|---|---|---|
| 7,144,214 B2 * | 12/2006 | Kinpara et al. | 415/4.4 |
| 2003/0030283 A1 | 2/2003 | Lusk | |
| 2007/0098563 A1 | 5/2007 | Rowan et al. | |
| 2008/0267777 A1 * | 10/2008 | Lux | 416/132 B |
| 2009/0110554 A1 * | 4/2009 | Dukovic et al. | 416/41 |
| 2009/0191057 A1 * | 7/2009 | Knutson | 416/23 |

FOREIGN PATENT DOCUMENTS

| | | |
|---|---|---|
| CN | 2559876 | 7/2003 |
| DE | 4442863 | 6/1996 |
| EP | 0276764 | 8/1988 |
| EP | 1273798 | 1/2003 |
| GB | 2175351 | 11/1986 |
| GB | 2 404 227 | 1/2005 |
| GB | 2404227 A * | 1/2005 |
| JP | 11159438 | 6/1999 |

OTHER PUBLICATIONS

International Search Report dated Dec. 17, 2009 for International Patent Application No. PCT/US2006/019326.

Chinese Office Action dated Feb. 12, 2010 for Chinese Patent Application No. 2006 80016461.1.

* cited by examiner

US 7,902,688 B2

VERTICAL AXIS WIND TURBINES

RELATED APPLICATIONS

This application is a continuation under 35 U.S.C. §120 of International Application No. PCT/US2006/019326, entitled VERTICAL AXIS WIND TURBINES, filed on May 15, 2006 under the Patent Cooperation Treaty, which was published by the International Bureau in English on Nov. 23, 2006 with International Publication Number WO/2006/125118, which designates the United States and claims priority to U.S. Provisional Application 60/681,210 entitled IMPROVED VERTICAL AXIS WIND TURBINES and filed on May 13, 2005. Each of the above-referenced applications is incorporated by reference herein in its entirety.

STATEMENT REGARDING FEDERALLY SPONSORED R&D

This invention was made with government support under USIC CRADA BG 02-182(00) and under Contract No. DE-AC02-05CH11231 awarded by the U.S. Department of Energy. The government has certain rights in the invention.

BACKGROUND OF THE INVENTION

1. Field of the Invention

The present invention relates generally to wind turbines, and more specifically to vertical axis wind turbines.

2. Description of the Related Art

Most wind turbine literature pertains to horizontal axis wind turbines, which appear to be the dominant form of wind energy production due to the higher efficiencies of the blades. The high blade efficiency is the result of high tip velocities, however such high velocities result in increased noise and increased damage upon collision with a blade during operation.

Many vertical axis designs have been proposed over the years having lower blade velocities, but they have not achieved widespread adoption in spite of the advantages that come with the lower blade velocities. The main problems have related to structural resonance failures, high manufacturing costs, and the requirement of placement very close to the ground where the wind velocities are lower. Power output is decreased due to the lower velocities near the ground.

Many of the vertical axis structural and cost problems are associated with attempts to recover additional wind energy by adjustments to the blade angle of attack. Other attempts vary the structural shape to accommodate high winds or gusts. Such designs inevitably lead to increased hardware complexity with concomitant increases in failure rates and manufacturing costs.

SUMMARY OF THE INVENTION

The embodiments described herein address several of the shortcomings of the prior art and uses modern-day engineering and system modeling tools to analyze complete system behavior in a variety of wind regimes.

One embodiment of the invention is a vertical axis wind turbine. This embodiment includes: at least one air foil, wherein said airfoil comprises an upper surface, a lower surface and a centerline; and wherein the distance from the upper surface to the centerline is the same as the distance from the lower surface to the centerline across the length of the airfoil.

Yet another embodiment is a vertical axis wind turbine rotor that has: an upper ring, a middle ring and a lower ring; a plurality of upper airfoils disposed vertically between said upper ring and said middle ring; and a plurality of lower airfoils disposed vertically between said lower ring and said middle ring.

Still another embodiment is a vertical axis wind turbine that includes: a vertical axis rotor comprising at least one airfoil and configured to rotate by the wind; and an air regulator controlled by centrifugal force from the rotor, and configured to slow the rotational speed of the rotor by moving the position of said at least one airfoil.

Neither this summary nor the following detailed description purports to define the invention. The invention is defined by the claims.

DETAILED DESCRIPTION

According to one embodiment, a vertical axis wind turbine is disclosed that has a rotor with blades designed and tested to generate maximum torque at approximately 2.5 times the wind velocity. In one embodiment, the blades have a fixed angle of attack to allow for self-starting of the turbine in 2-4 m/s winds, and to produce rated power at 11 m/s winds. The wind turbines of this embodiment capture energy in all wind directions and in gusty conditions without any modification of the basic shape of the turbine. They are also arranged in such a fashion so as obviate the requirement of any central axis through the turbine. The arrangement utilizes aerodynamic forces to maintain a proper shape, and continued rotation about the proper axis of rotation.

Also disclosed herein are aerodynamic regulators, also known as aerodynamic spoilers and aerodynamic brakes. In one embodiment, the aerodynamic regulators are built into a top cross member of the rotor in the wind turbine. The regulators are activated by centrifugal force and spring energy to control the maximum rotational rate of the rotor, and thereby prevent failure of the turbine due to excessive rotational rates.

In yet another embodiment, the wind turbine contains a mechanical brake that can be actuated to slow or stop the rotor at a desired time. In one embodiment, the wind turbine includes a rotor connected to a rotating pipe. The rotating pipe connects to a hub at the base of the turbine which contains a space for an axial gap alternator and/or an additional mechanical braking system to control the angular velocity. Such mechanical braking systems allow for stopping the turbine in high winds and for maintenance. When operated with the axial gap alternator, the wind generator essentially comprises a single moving part. With proper sizing of the alternator, output voltages may be obtained near normal line voltages for the location of use.

Vertical Axis Wind Turbine: Four Blade Embodiment

Figure 1:
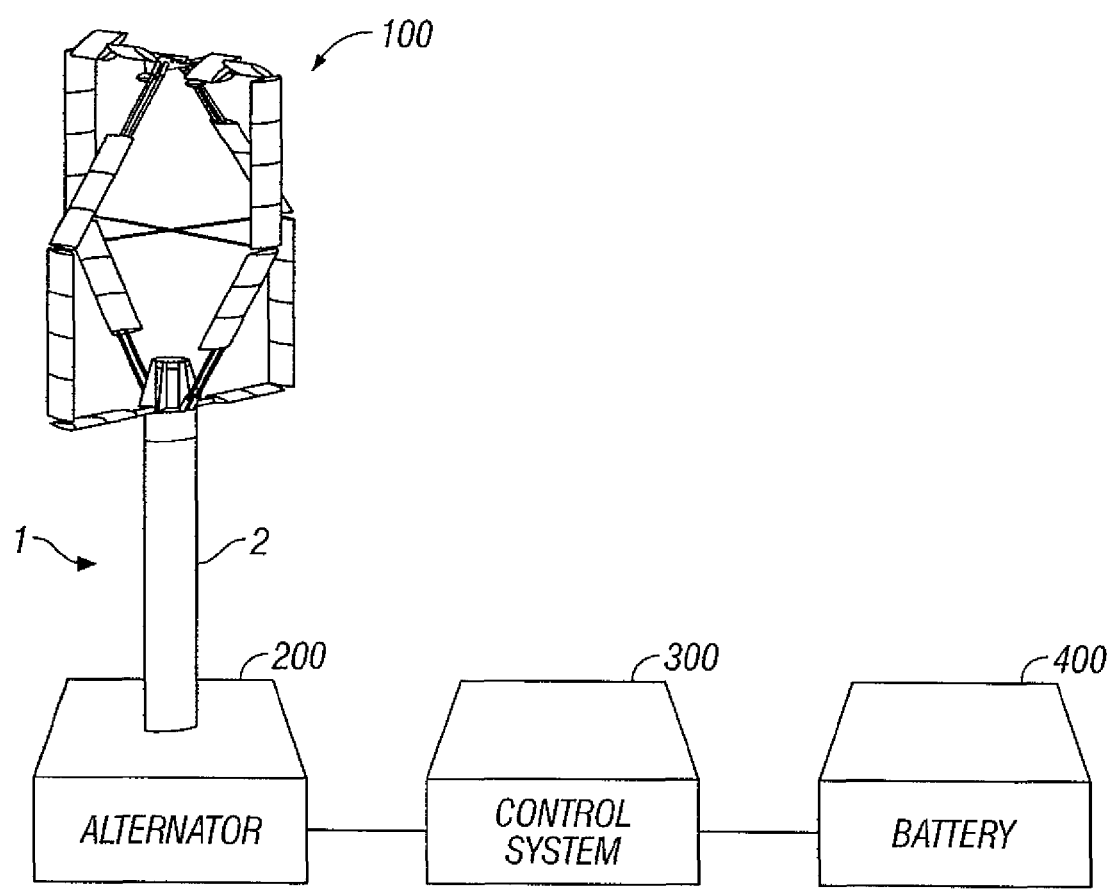
FIG. 1 shows one embodiment of a vertical axis wind turbine system engaged with an alternator, control system and battery.

FIG. 1 shows a sample embodiment of a vertical axis wind turbine system 1 that includes a rotor 100 mounted on a rotating tube 2 so that rotation of the rotor 100 leads to rotation of the tube 2. The base of the tube 2 is engaged with an alternator 200 so that rotation of the tube 2 results in rotation of the alternator 200. The alternator 200 is electrically connected to a control system 300 and battery 400. As illustrated, the rotor 100 is at an elevated position with respect to the ground to gain access to higher wind velocities. The rotor 100 is connected to an alternator 200 in order to convert the mechanical energy from the rotor into electrical energy. The alternator 200 is connected to a control system 300, which is connected to a battery 400 in order to store the electrical energy generated by the wind turbine 100. The control system 300 controls the flow of electricity to the battery. Of course, it should be realized that the wind turbine system 1 could also couple directly or indirectly to an electrical grid in order to provide power to the electric grid instead of a battery. Additionally, it should be realized that the rotor 100 can be used to mechanically turn a pump or other device to perform work.

Figure 2A:
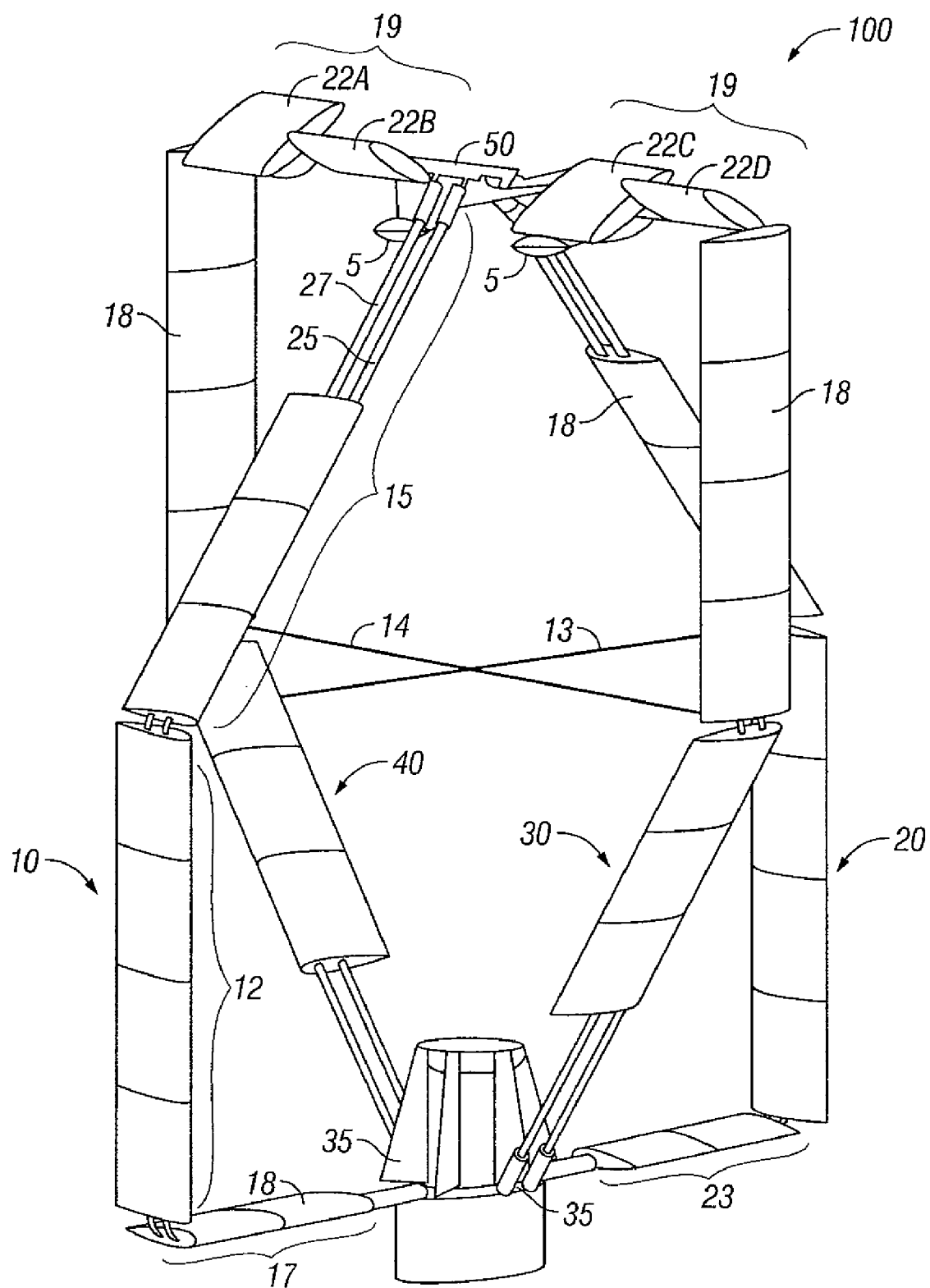
FIG. 2A shows a schematic front view of one embodiment of a four blade vertical axis wind turbine system.
Figure 2B:
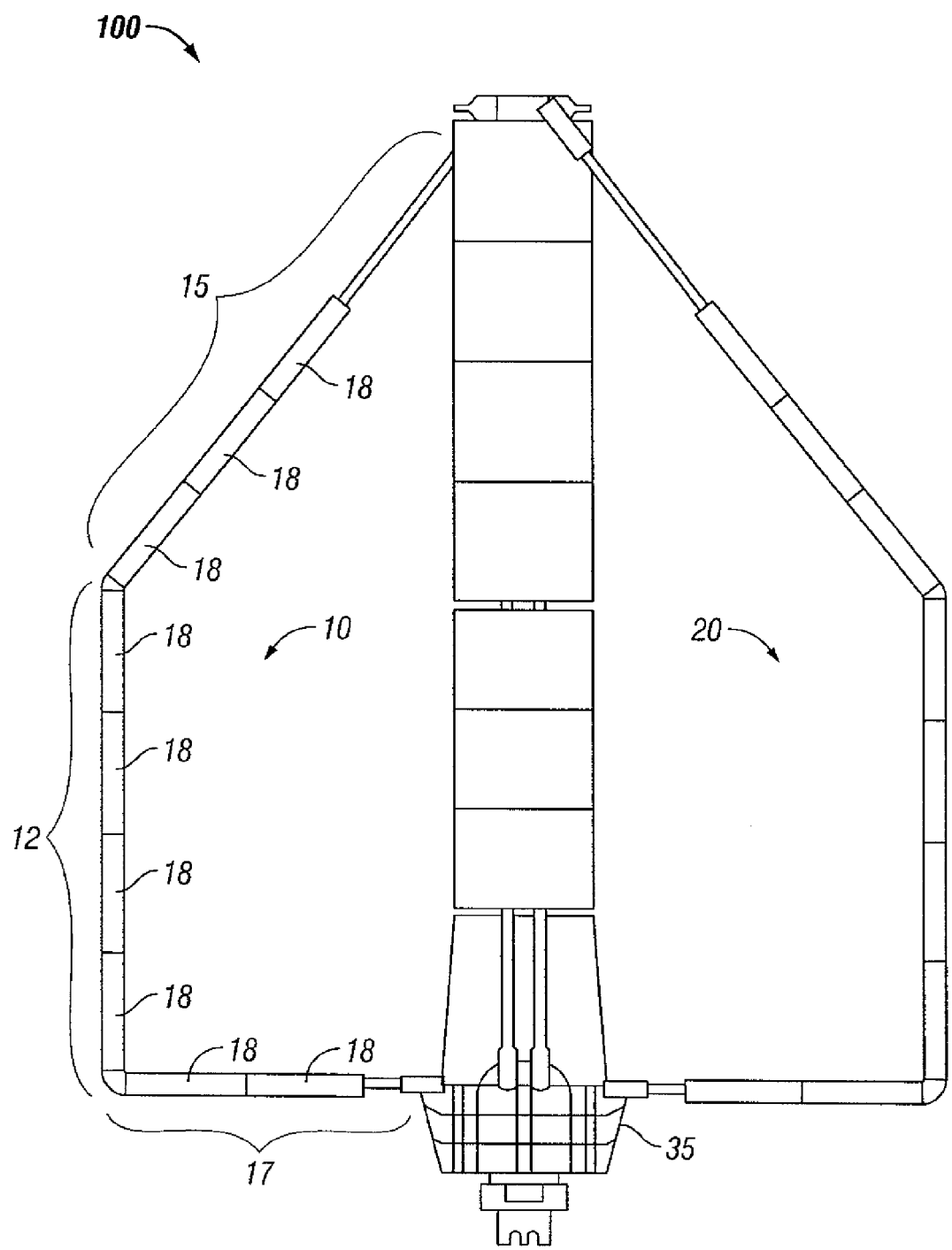
FIG. 2B shows a schematic side view of one embodiment of a four blade vertical axis wind turbine system.
Figure 2C:
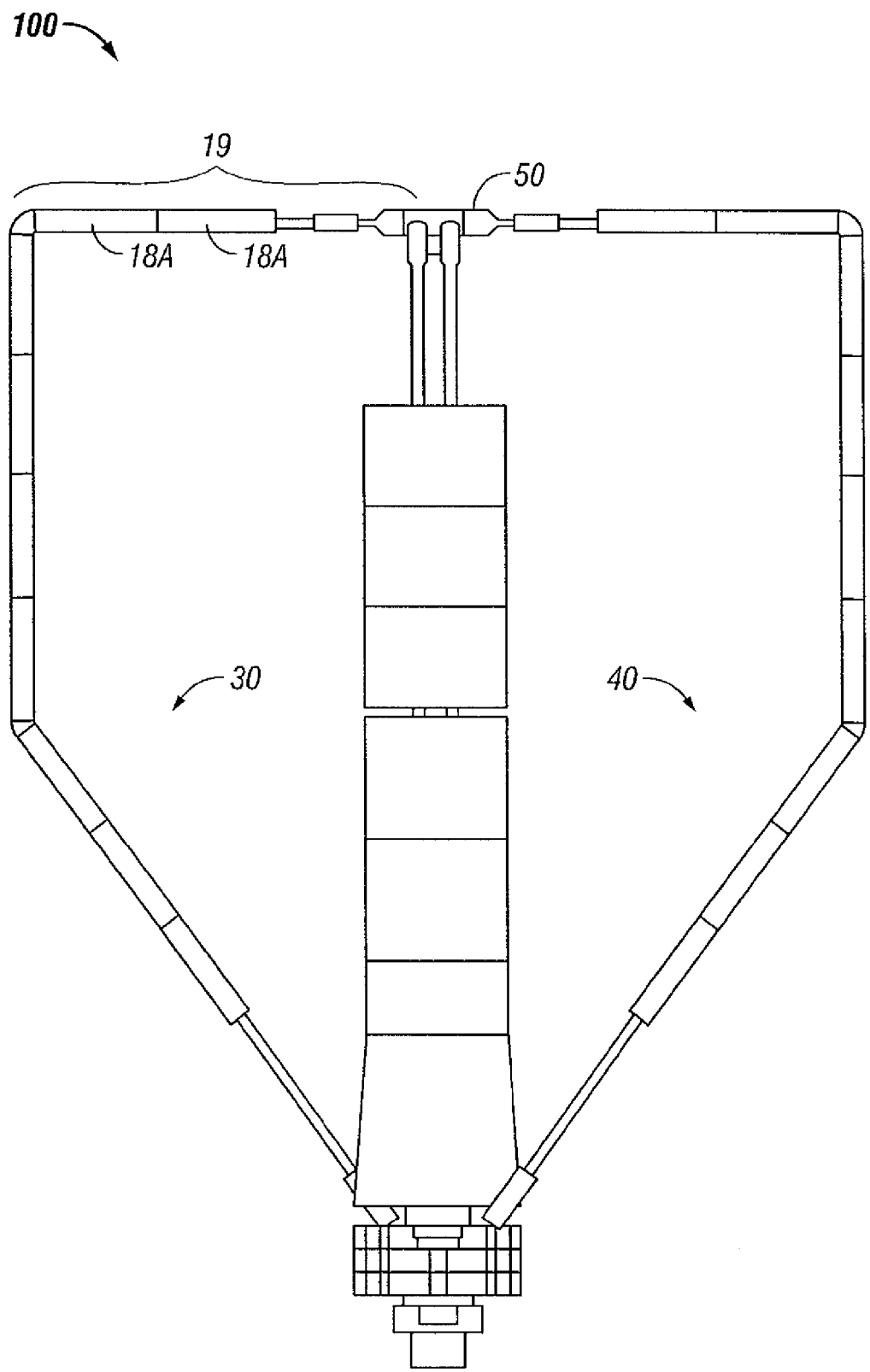
FIG. 2C shows a schematic side view from a different angle of one embodiment of a four blade vertical axis wind turbine system.
Figure 2D:
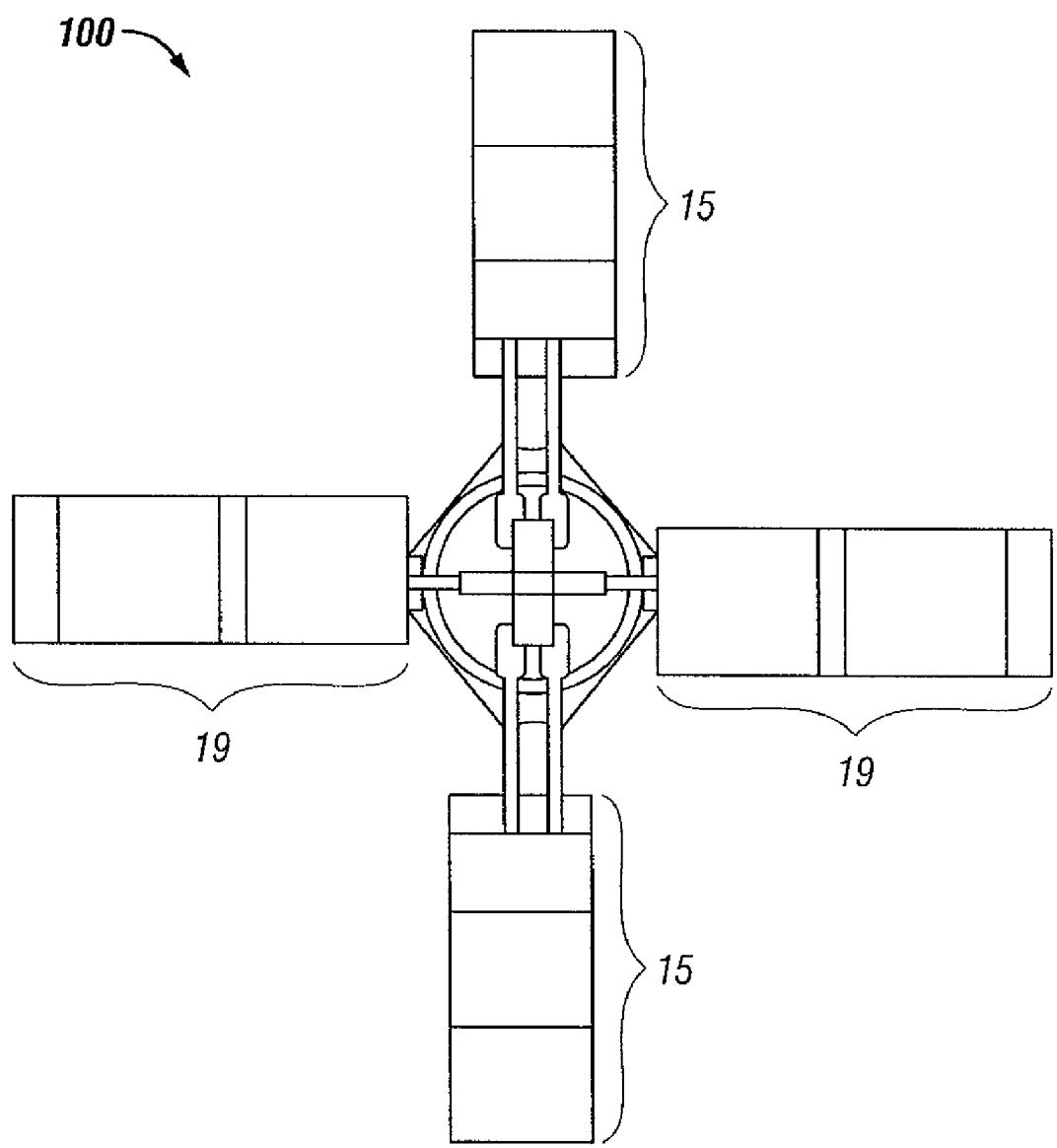
FIG. 2D shows a schematic plan view of one embodiment of a four blade vertical axis wind turbine system.

FIG. 2A shows a schematic front view of the four blade vertical axis rotor 100. FIG. 2B shows a schematic side view of the four blade vertical axis rotor 100, and FIG. 2C shows a schematic side view from a different angle of the four blade vertical axis rotor 100. FIG. 2D shows a top view of the four blade vertical axis rotor 100.

As shown in FIGS. 2A-2D, the vertical axis rotor 100 is comprised of four angled blade units 10, 20, 30, and 40. Although the four blade units comprise the major functional elements of the four-bladed embodiment shown in FIGS. 2A-2D, any integer number of blade units greater than two are feasible, with consideration given to the extent of physical space and aerodynamic capture. Furthermore, although certain angles are used in the embodiment described herein, embodiments of the invention are not limited to any particular angle, but rather relate to the configuration of the blades with relation to one another.

Each blade unit 10 is comprised of a lower blade assembly 12 and an upper blade assembly 15. Both blade assemblies are comprised of identical or essentially identical airfoils 18 that are attached to two internal tubes (not shown) that carry the structural load and provide rigidity and the optimal angle of attack for the blade. The upper blade assembly 15 has extension tubes 25 and 27 that allow for direct attachment to a top attachment point, the upper joint 50. A horizontal return member 17 functions as a return from a lower blade assembly 12 to a lower joint hub 35 where the rotational force is transferred to an alternator 200 or other energy transformation mechanism (not shown). The length of extension tubes 25 and 27 is such to provide an included angle of the blade unit 10 of approximately 145 degrees between the lower blade assembly 12 and the upper blade assembly 15. The 145° angle allows an overall shape of the wind turbine to be established, although other suitable angles may be used. All of the horizontal return member 17, lower blade assembly 12, upper blade assembly 15, extension tubes 25 and 27, and hub 35 are suitably interconnected with substantially rigid connectors so as to create the blade unit 10 shape shown in FIGS. 2A-2D.

In the embodiment shown in FIGS. 2A-2D, the four blade units 10, 20, 30, and 40 are attached at the top joint 50 and lower joint 35, with each blade unit rotationally disposed approximately 90° from one another around the plane of rotation, and with each dual blade assembly rotated by 180° to each other in the vertical direction. In this arrangement, blade units 10 and 20 are 180° opposite from each other, as best shown in FIG. 2B. Inverted blade units 30 and 40 are also 180° opposite from each other, as best shown in FIG. 2C. Through essentially rigid joints interconnecting the components of each blade unit, the vertical shape of the wind turbine is established.

As best shown in FIG. 2B, airfoils 18 essentially comprise the lower horizontal return member 17. These airfoils 18 act as a fairing to reduce aerodynamic drag. These airfoils 18 may be mounted at small non-zero angles of attack to assist in the management of vertical force loads on the bearings, while not creating substantial rotational drag. For example, the small non-zero angles of attack may be +/−5 degrees. The lower horizontal return member 17 completes the connection of the blade unit 10 to the lower joint 35. A similar lower horizontal return member 23 performs the same function with blade unit 20.

As shown in FIG. 2C four movable airfoils 22a-d are located on the upper horizontal return member 19. Upper horizontal return member 19 is used in each of the blade units 30 and 40, and completes the connection of the blade units to the top joint 50. The movable airfoils 22a-d are actuated by rotation of the rotor 100 so that as the rotor spins faster, the airfoils articulate to a greater degree. In one embodiment, the articulation of the movable airfoils 22a-d is controlled by weights 5 that move radially in response to the rotational forces acting on the rotor 100. As the rotor 100 spins, the weights 5 move outwardly and through a mechanical linkage alter the position of the movable airfoils 19. Accordingly, as the rotor 100 spins at a faster rate, the weights 5 move progressively outward by centrifugal force and thereby cause the movable airfoils 19 to change position and become drag inducing devices. This results in the rotor 100 slowing its rotational speed.

In this embodiment, the movable airfoils 22a and 22b articulate in opposite directions, presenting an increased surface area with consequent increased drag. Similarly, the movable airfoils 22c and 22d articulate in opposite directions. Thus, as the rotor spins faster, these airfoils act as regulators, or air brakes to slow the rotor's rotation. The actuation of the movable airfoils 22a-d are most simply implemented by internal spring and centrifugal actuators controlled by the movement of the weights 5 and which maintain the rotational rate of the rotor 100 at or below a maximum limit.

Returning to FIG. 2A, movable airfoils 22a-d are shown deployed as if the wind turbine were rotating very rapidly and needed to be slowed. The movable airfoils 22a-d are deployed at opposing angles to yield approximately zero vertical forces on the rotor 100 while providing drag forces to slow the turbine. The movable airfoils 22a-d could also be deployed in a like direction to provide vertical forces, if desired, with the same drag reduction. A plurality of movable airfoils could be also be placed on horizontal surfaces to control the rate of rotation. Thus, embodiments of the invention are not limited to this particular configuration or number of movable airfoils.

Guy wire 13 is disposed between blade units 10 and 20. Similarly guy wire 14 is disposed between blade units 30 and 40. The guy wires 13 and 14 function as tensile members that are put into tension by centrifugally induced rotational loads from the paired blade assemblies when rotating.

In certain embodiments, the lower joint hub 35 may be connected to a hub that houses the mechanical brake and the axial gap alternator and an attachment to a tower comprised of nesting segments that are slightly tapered (not shown). Furthermore, each nesting segment may have at least two tabs at a point along the tube near the narrow tapered end that limits the added segment's travel and sets the amount of overlap from segment to segment to the allowed overlap for strength of the overall tower. The tower can thus be of a variable height appropriate for the installation site and the tower segments can be transported easily in smaller vehicles.

Figure 3:
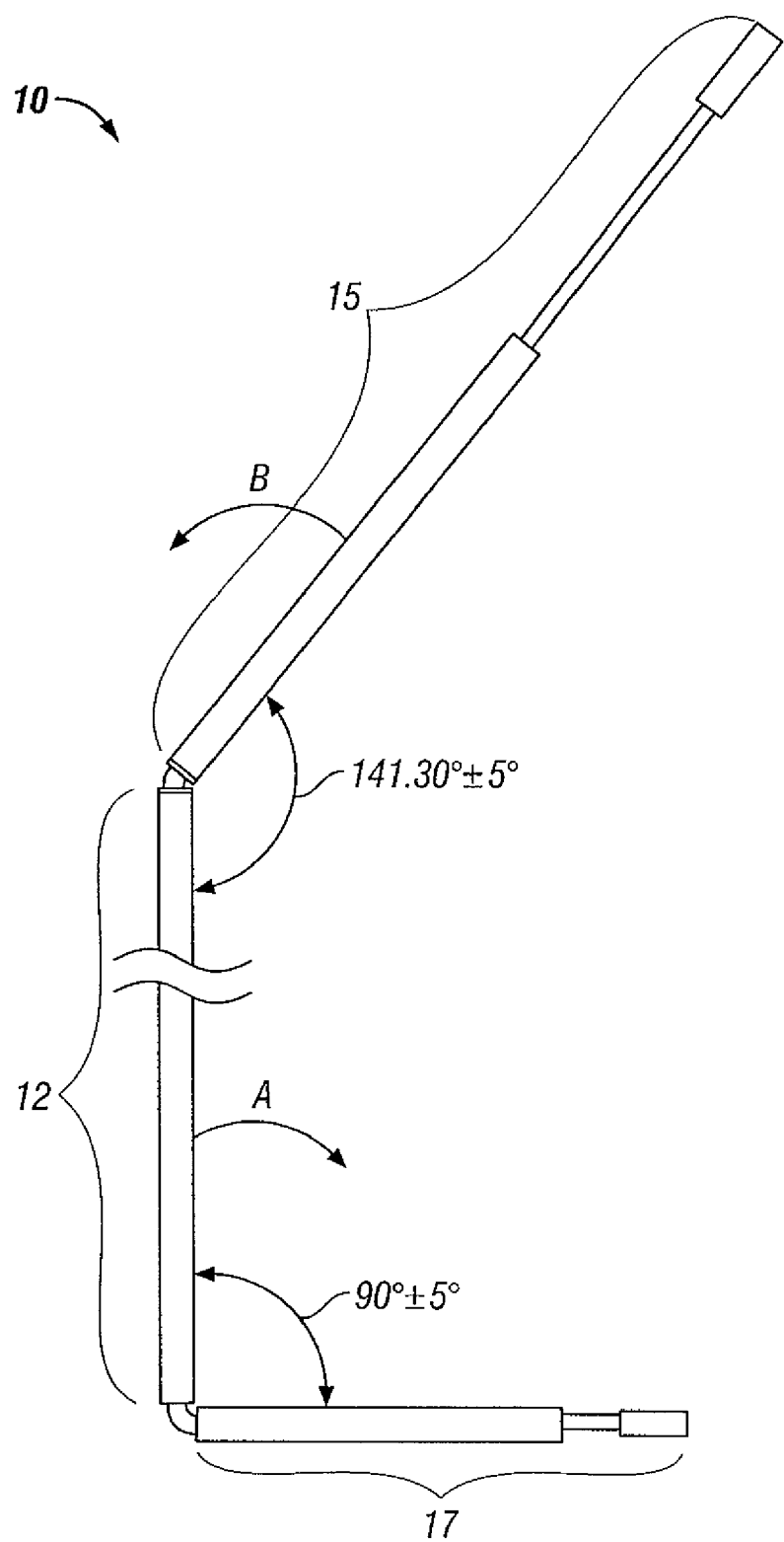
FIG. 3 is a schematic view of a blade unit for use with certain embodiments of a vertical axis wind turbine.

FIG. 3 is a schematic view of a blade unit 10 for use with certain embodiments of a vertical axis wind turbine described herein. In certain embodiments, a blade unit 10 may be foldable. Using the sample embodiment of the blade unit 10 shown in FIG. 3, the lower blade assembly may be folded along the path of arrow A so as to contact the lower horizontal return member 17. The upper blade assembly 15 may then be folded along the path of arrow B. As shown, the angle between the return member 17 and the lower blade assembly 12 is 90 degrees with an error of plus or minus five degrees. The angle created by the lower blade assembly 12 and the lower horizontal return member 17 is 141.30 degrees, plus or minus five degrees. Of course, embodiments of the invention are not limited to any of these particular angles and other configurations of the rotor are contemplated.

Airfoil

Figure 4A:
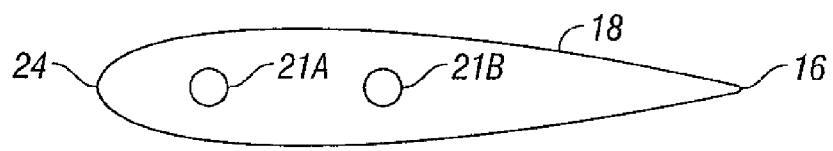
FIG. 4A is a schematic plan view of a cross section of one embodiment of an airfoil showing openings for two structural elements and a blunted narrow end.

FIG. 4A is a schematic plan view of an airfoil 18 having a leading edge 24 and rounded trailing edge 16. The cross-section has two apertures 21a,b for the insertion of structural elements to stabilize the airfoil 18 and carry the loads with minimal distortion of the airfoil 18. Other embodiments of the structural members are also within the scope of the invention. Exemplary structural elements are the extension tubes 25 and 27 (FIG. 2A). In one embodiment, the airfoil 18 can be manufactured of foam filled composite or metal with stringers. It is suitable for extrusion or pultrusion manufacturing techniques.

Figure 4B:
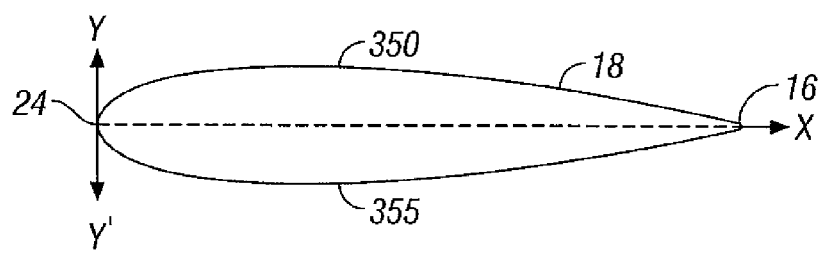
FIG. 4B is a cross-sectional view of one embodiment of an airfoil for use with the wind turbine system.

As shown, the design of the airfoil 18 can be described in relationship to a centerline x axis drawn across the airfoil 18 and a vertical y axis drawn across the airfoil. As shown in FIG. 4B the upper surface 350 and lower surface 355 maintain a constant distance from the x axis along the length of the airfoil 18. Thus, at any point along the upper surface 350, the distance from the upper surface 350 to the centerline x is the same as the distance from the lower surface 355 to the centerline x.

FIG. 4B is a schematic plan view of one embodiment of an airfoil for use with the wind turbine system. With reference to FIG. 4B, one embodiment of the shape of an airfoil 18 may be designed using the coordinate table shown below in Table 1, wherein 'b' is the chord length, 'c' is the maximum thickness of the profile, and b/c is a constant.

TABLE 1

| X and Y Coordinates of Airfoil | | | | | | | | | |
|---|---|---|---|---|---|---|---|---|---|
| x/b | 0 | 0.001 | 0.002 | 0.003 | 0.004 | 0.005 | 0.006 | 0.007 | 0.008 | 0.009 |
| y/c | 0 | 0.035078 | 0.049608 | 0.060757 | 0.070156 | 0.078436 | 0.085923 | 0.092807 | 0.099215 | 0.105233 |
| x/b | 0.01 | 0.02 | 0.03 | 0.04 | 0.05 | 0.051928 | 0.06 | 0.07 | 0.08 | 0.09 |
| y/c | 0.110926 | 0.156873 | 0.192129 | 0.221852 | 0.248038 | 0.252774 | 0.271178 | 0.291407 | 0.309567 | 0.326335 |
| x/b | 0.1 | 0.15 | 0.2 | 0.25 | 0.3 | 0.35 | 0.4 | 0.45 | 0.5 | 0.55 |
| y/c | 0.342234 | 0.408723 | 0.454353 | 0.482354 | 0.496254 | 0.5 | 0.495243 | 0.480917 | 0.457402 | 0.427095 |
| x/b | 0.6 | 0.65 | 0.7 | 0.75 | 0.8 | 0.85 | 0.9 | 0.95 | 0.986813 | 1 |
| y/c | 0.392118 | 0.353088 | 0.310766 | 0.26637 | 0.220631 | 0.173868 | 0.127219 | 0.081241 | 0.045298 | 0 |

Although FIG. 4B and the above coordinate table illustrate one sample embodiment of an airfoil 18 for use with the wind turbine as described herein, alternative shapes that may produce lift can be used. The sample shape of the airfoil 18 was selected for use with certain embodiments discussed herein because of its high efficiency at low wind speed. For example, a low wind speed may be 3-4 meters/second. The aerodynamic coefficients of this embodiment of the airfoil 18 are such that the vertical axis rotor 100 is self-starting when the airfoil 18 is affixed at an angle of attack of 0-5°. However, in one embodiment, the angle of attack is fixed at 2°. The airfoil's trailing edge 16 is rounded to avoid turbulence when the airfoil 18 is traveling backwards into the wind as it does during each revolution.

Figure 4C:
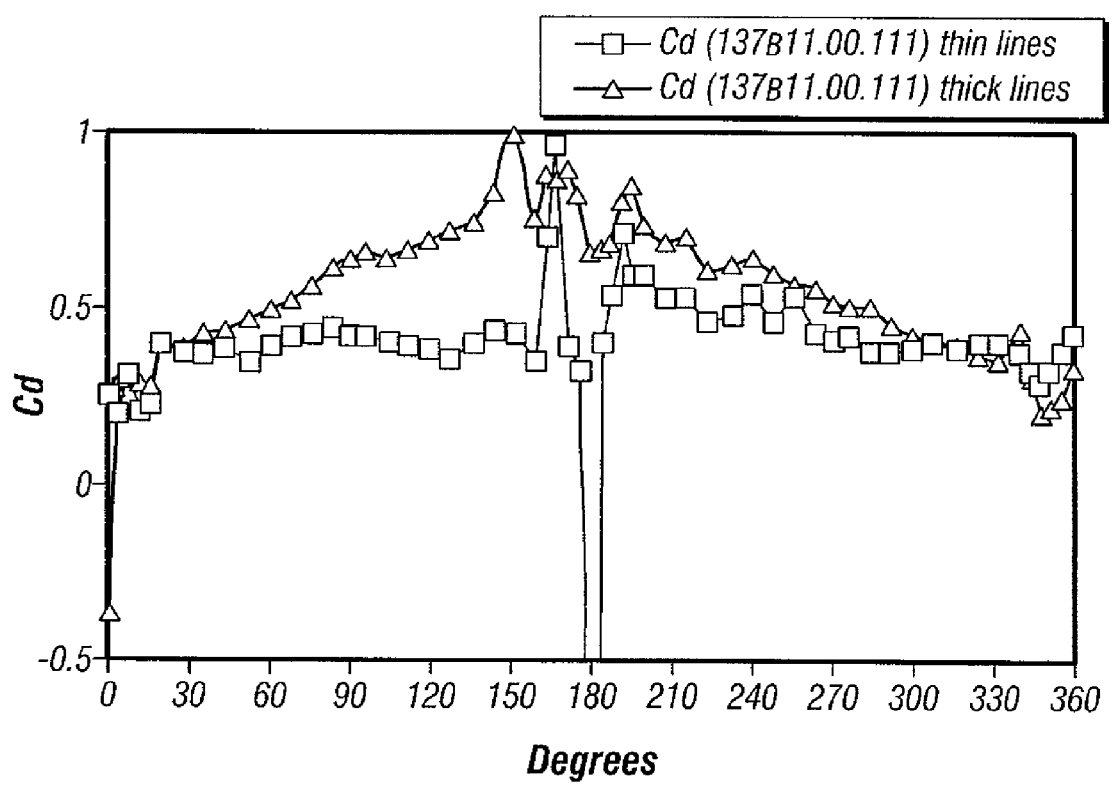
FIG. 4C is a graph of hydrodynamic test results showing that a blunted trailing edge produces much less turbulence than a sharp edge passing through 180 degrees of rotation.

FIG. 4C is a graph of hydrodynamic test results showing that the blunted trailing edge 16 produces much less turbulence than a sharp edge traveling through 180 degrees of rotation. The graph shows the results of hydrodynamic tests comparing the drag coefficient of an airfoil with a blunt trailing edge (dark squares) to a similar airfoil with a sharp trailing edge (dark triangles). The blunt trailing edge reduced the turbulence potential and the dynamic structural loading, both of which increased the efficiency of the turbine.

Vertical Axis Wind Turbine: Six Blade Embodiment

Figure 5:
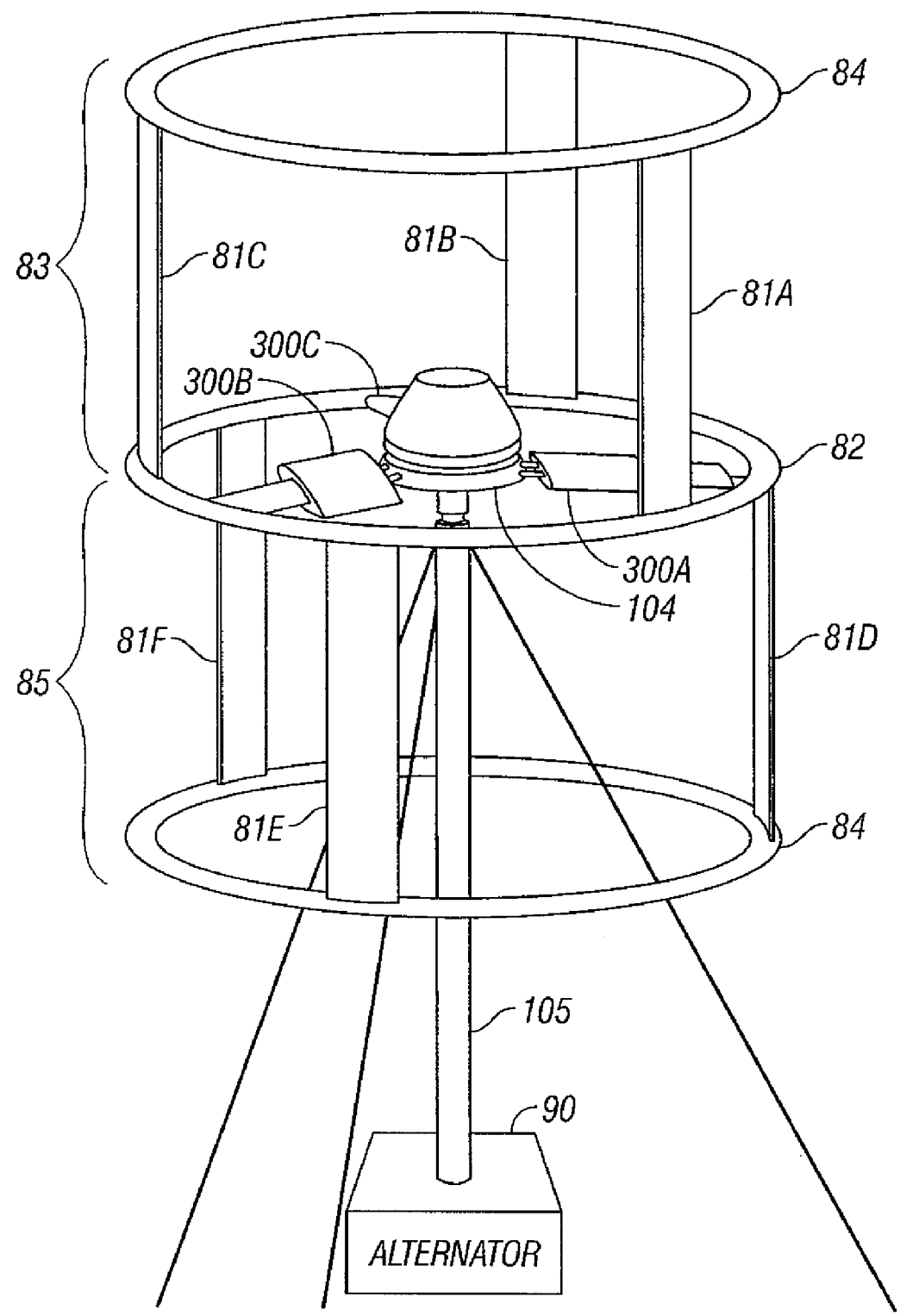
FIG. 5 shows one embodiment of a six bladed vertical axis wind turbine engaged with an alternator.

FIG. 5 is an embodiment of a six bladed vertical axis rotor 600 engaged with an alternator 90. The six bladed vertical axis rotor 600 is useful in situations where less than 10% of ripple forces are desired to be mechanically applied to the system. According to the embodiment shown, six vertically oriented blade units 81 are attached to a central circular ring 82. The central circular ring 82 connects to a base 104 which spins a pole 115 in order to turn the alternator 90. The blade units 81a-c in an upper portion 83 of the rotor 600 are set at half the angle of the blade units 81d-f in a lower portion 85. This configuration of offset blades resulted in an improved start-up and minimized dynamic impulses from the blade units 81 to the structure 600. Thus, the rotor 600 was able to start spinning in lower velocity winds, and as it spun there were minimized impulses through the device. A hollow, aerodynamically shaped ring 84 at both the top and bottom of the rotor 600 serves as a fairing end for the blade units 81 and distributes the blade tip loads around the central ring 82. The use of aerodynamically shaped torus as the top and bottom rings 84 allows these rings to reduce and terminate tip induced from the end vortices of the blade units. As is known, a torus is a doughnut-shaped surface of revolution generated by revolving a circle about an axis coplanar with the circle. In addition, the configuration and position of the rings 84 serves as structural elements for the rotor 600. As will be described below, a set of three aerodynamic regulators 300*a-c* allow the rotor 600 to reduce its rotational speed in heavy winds.

Although the six blade unit design provides a balance of light weight and strong structure, as well as its use of aerodynamic regulators, other designs using other numbers of blade units may also be used according to certain embodiments disclosed herein depending on the specific conditions and requirements desired from the turbine.

Figure 6:
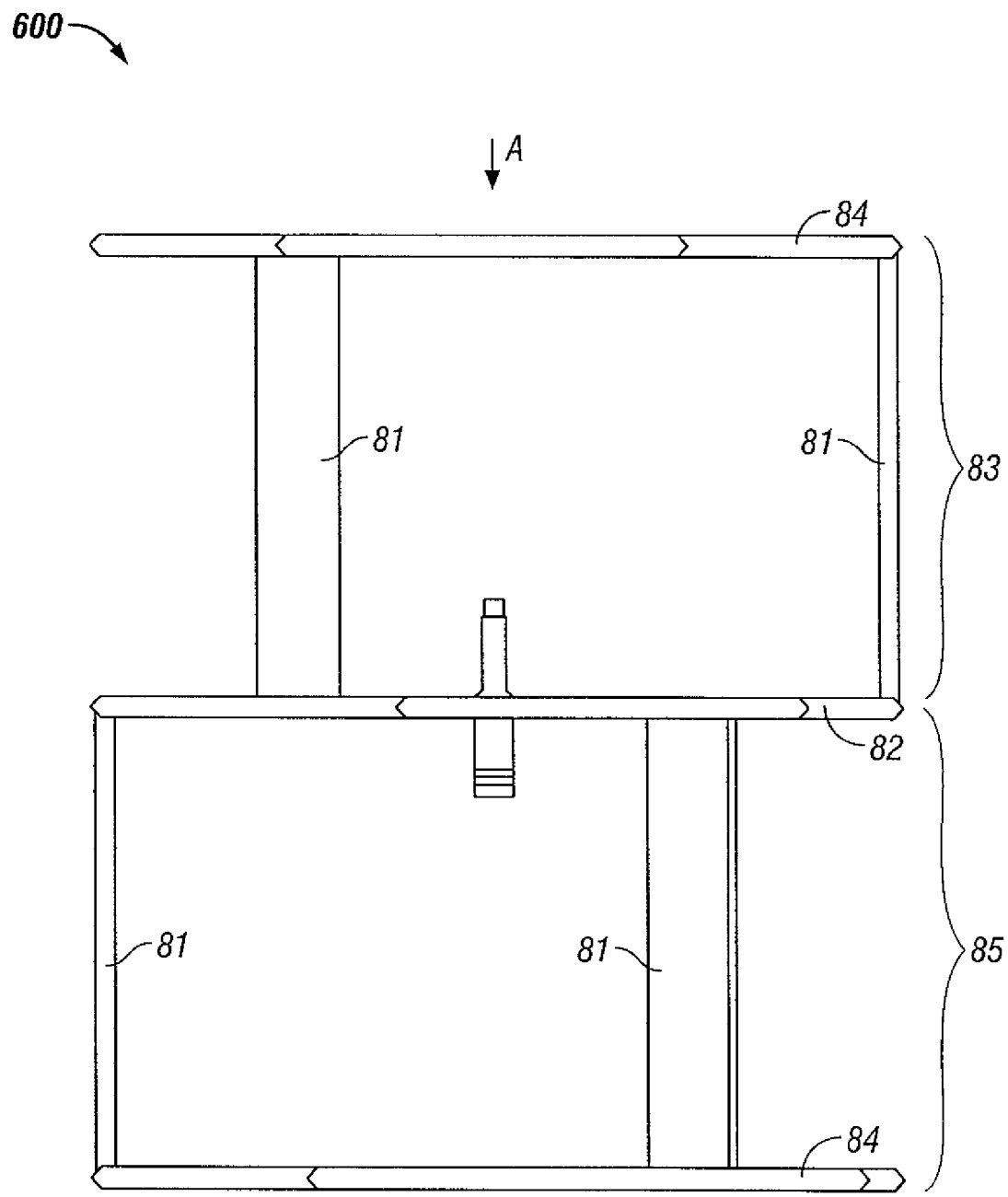
FIG. 6 is a schematic side view of one embodiment of a six bladed vertical axis wind turbine.

FIG. 6 is a schematic side view of the six bladed rotor 600. According to FIG. 6 and as discussed above with reference to FIG. 5, the rotor 600 rotates about a central axis A. In addition, the blade units 81 in the upper portion 83 of the rotor 600 are offset by sixty degrees relative to the blade units 81 in the lower portion 85 in order to facilitate start-up of the turbine and reduce dynamic impulses between the blade units 81 and the rotor 600. Although the embodiment shown turns the blade units 60 degrees, any other degree angle may be used to facilitate start-up of the turbine and to reduce dynamic impulses. Furthermore, in both the upper portion 83 and lower portion 85, the blade units 81 are located 120 degrees away from each other. Although the embodiment shown locates the blade units 120 degrees away from one another, any other degree angle may be used to facilitate use of the turbine.

It should be realized that in one embodiment the shape of the blade units 81 is the same as the shape of the airfoils 18. Thus, the dimensions of the shape of the airfoil 18 shown in Table 1 above are useful in designing the shape of the blade units 81. In addition, the blade units 81 may have a blunted trailing edge, as described above for the airfoils 18. Of course the shape of the blade units 81 is not limited to any particular shape, and may have other advantageous shapes.

Figure 7:
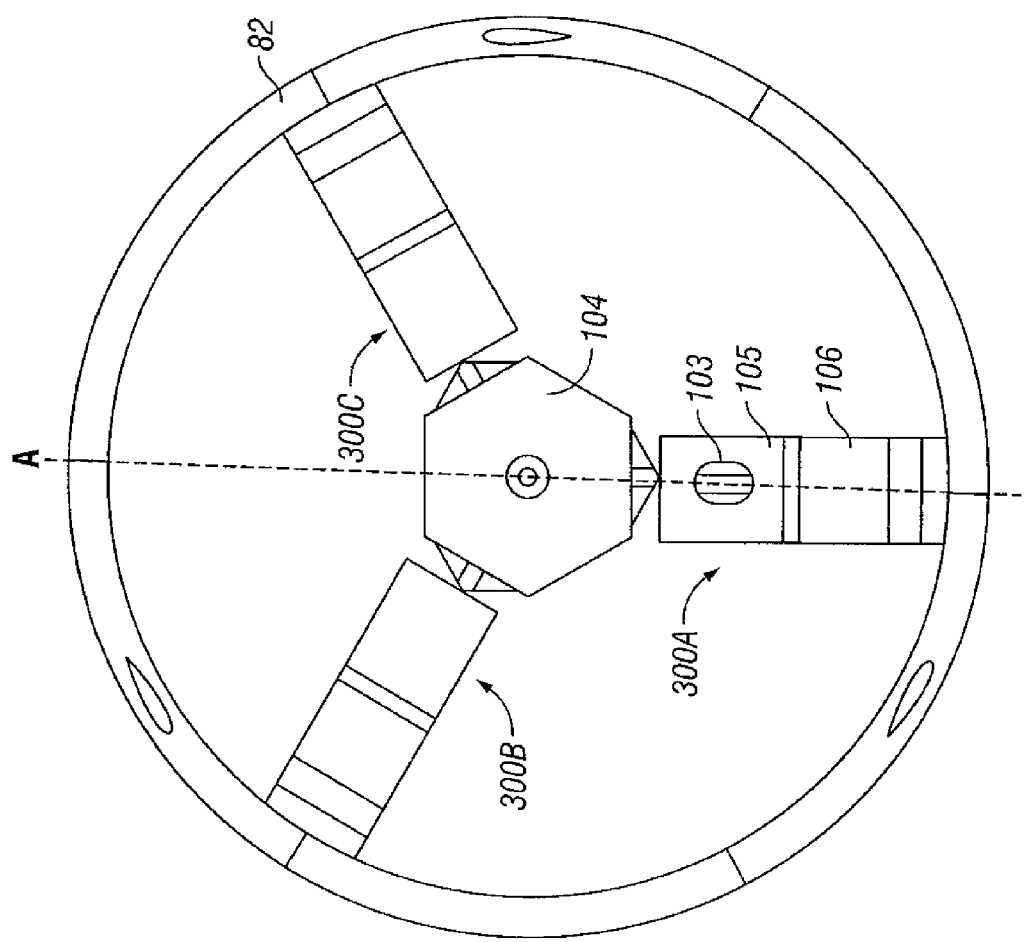
FIG. 7 is a top view of one embodiment of a six bladed vertical axis wind turbine.

FIG. 7 is a top view of the six bladed vertical axis rotor 600. The central ring unit 82 is connected to the base 104 through pipes 103 in the aerodynamic regulator 300. The pipes 103 traverse and engage movable airfoils 105 and 106 within the regulator 300. The aerodynamic regulator 300 uses centrifugal forces from the rotation of the rotor 600 to move the airfoils 105 and 106 in opposite directions to slow the movement of the rotor. By moving the airfoils 105 and 106 in opposite directions, they act as actuated brakes to reduce the rotational efficiency of the rotor 600.

Aerodynamic Regulator

Figure 8:
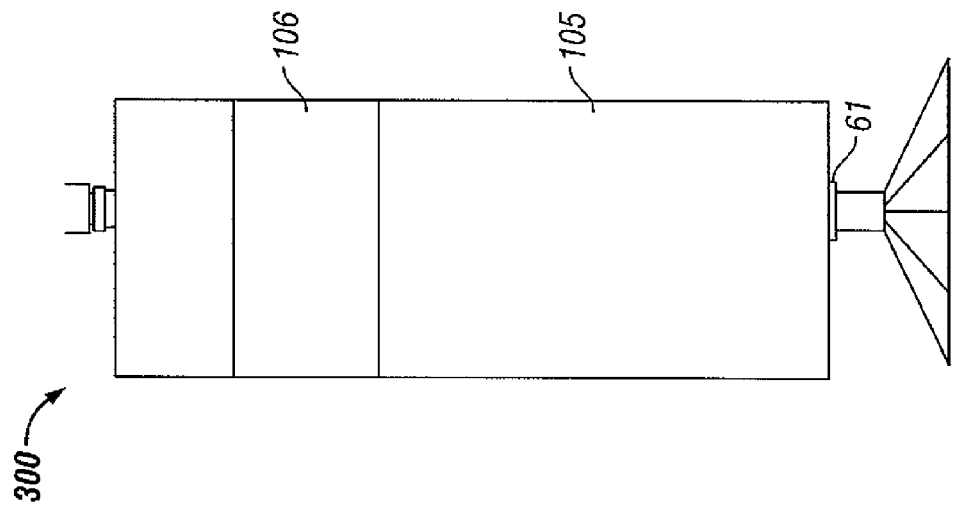
FIG. 8 is a top view of an embodiment of an aerodynamic regulator assembly.

FIG. 8 is a schematic plan view of the aerodynamic regulator 300 that can be used to slow the rotation of the rotor 600 in heavy winds. According to the embodiment shown in FIG. 8, the regulator airfoils 62 and 63 have different lengths from one another to account for the lower velocity proximal to the center of rotation of the attachment point 61 to the base 104. An additional drag reducing fairing may be added at the distal end of the regulator 300 (not shown). While the fairing remains stable, regulator airfoils 105 and 106 move in opposite directions to counterbalance the aerodynamic forces which may act on them. In certain embodiments, the wind turbine may feature a wind sensor so that the aerodynamic regulator is activated to regulate the RPM of the turbine when wind speeds increase above 25 miles per hour. However, when the winds become above, for example, 50 miles per hour, the wind sensor could activate a mechanical brake which slows or completely stops the rotor to prevent damage in heavy winds.

Figure 9:
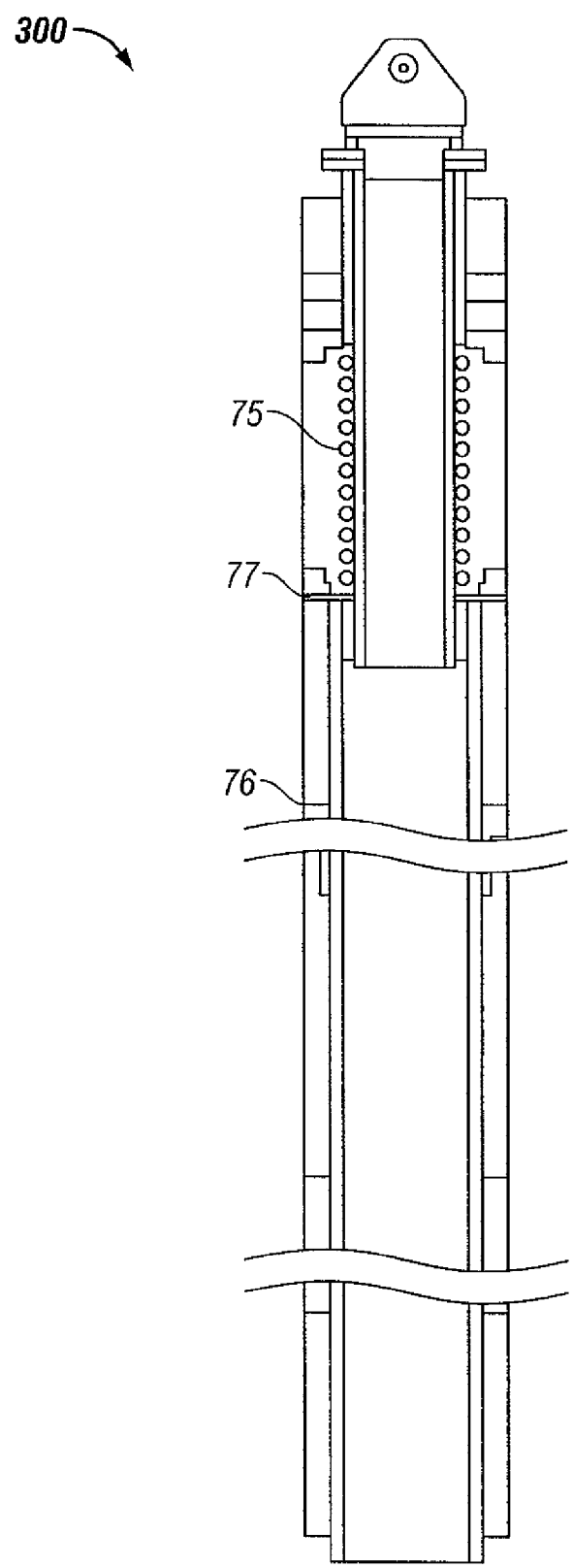
FIG. 9 is a cross-sectional view of an embodiment of an aerodynamic regulator assembly.

FIG. 9 is a schematic cross sectional view of an embodiment of the aerodynamic regulator assembly 300. As shown in FIG. 10, an actuator is shown where a small tube is attached through a pivot point to weights and whereby a force is applied through a sliding joint 77 to a spring 75. As the regulator assembly 300 spins around a center axis of the rotor 600, the centrifugal force on the weights causes them to move outwardly from the center axis. This movement results in actuation of the movable airfoils so that they begin to act as air brakes to slow the rotation of the rotor 600. The spring 75 is chosen to allow actuation of the movable airfoil at the correct rotational velocity. The sliding motion caused by the internal weights actuates a cam or threaded element on the tube that changes the angle of attack of the airfoil. In one embodiment of the actuator, the weight is a heavy tube within the outer tube and pushes against the spring until the centrifugal forces overcome the spring force. attached to the weighted tube are oppositely sensed threaded cams that actuate the airfoils. the aerodynamic regulator thus adjusts the rotations per minute ("RPM") of the rotor to a relatively stable rate without additional control equipment.

It will be appreciated by those skilled in the art that the above-described wind turbine may be straightforwardly adapted or extended in various ways. While the foregoing description makes reference to particular embodiments, the scope of the invention is defined solely by the claims that follow and the elements recited therein.

What is claimed is:

1. A vertical axis wind turbine, comprising:
    a vertical axis rotor comprising:
        an upper ring, a middle ring and a lower ring;
        a plurality of upper airfoils disposed vertically between said upper ring and said middle ring;
        a plurality of lower airfoils disposed vertically between said lower ring and said middle ring,
    wherein at least one of said airfoils comprises an upper surface, a lower surface and a centerline,
    wherein the distance from the upper surface to the centerline is the same as the distance from the lower surface to the centerline across the length of the airfoil; and
    an air regulator comprising two moveable airfoils,
    wherein the air regulator is configured to move the two movable air foils, and wherein the air foils move in opposite directions to slow the rotational speed of the rotor.

2. The wind turbine of claim 1, wherein the upper ring and lower ring each comprise a torus.

3. The wind turbine of claim 1, wherein the at least one airfoil is made from a foam filled composite material.

4. The wind turbine of claim 1, wherein the at least one airfoil has a forward edge and a trailing edge, and wherein the trailing edge is rounded.

5. The wind turbine of claim 1, wherein the middle ring is a circular ring.

6. The wind turbine of claim 1, wherein said plurality of upper airfoils comprises three airfoils.

7. The wind turbine of claim 1, wherein said plurality of lower airfoils comprises three airfoils.

8. The wind turbine of claim 1, wherein said plurality of upper airfoils is offset from said plurality of said lower airfoils by sixty degrees.

9. The wind turbine of claim 1, wherein said rotor is connected to a center pole which rotates when the rotor rotates.

10. The wind turbine of claim 9, wherein said center pole is connected to an alternator which rotates when said center pole rotates.

11. The wind turbine of claim 10, wherein said alternator is electrically connected to a control system for charging a battery.

12. The wind turbine of claim 1, wherein the rotor is connected to a mechanical device to perform work as said rotor spins.

13. The wind turbine of claim 1, wherein the air regulator is configured to slow the rotational speed of the rotor for control at high wind speed.

14. The wind turbine of claim 1, wherein the plurality of upper airfoils and the plurality of lower airfoils are disposed at an angle of attack of 0-5 degrees.

15. A vertical axis wind turbine, comprising:
a vertical axis rotor comprising:
an upper ring, a middle ring and a lower ring;
a plurality of upper airfoils disposed vertically between said upper ring and said middle ring; and
a plurality of lower airfoils disposed vertically between said lower ring and said middle ring,
wherein at least one of said airfoils comprises an upper surface, a lower surface and a centerline,
wherein the distance from the upper surface to the centerline is the same as the distance from the lower surface to the centerline across the length of the airfoil,
wherein said rotor further comprises an air regulator configured to slow the rotational speed of the rotor for control at high wind speed,
wherein said air regulator comprises two movable airfoils, and
wherein the air regulator moves the two moveable airfoils, and wherein the two airfoils move in opposite directions.

16. The wind turbine of claim 15, wherein the two moveable airfoils have differing lengths.

17. The wind turbine of claim 15, wherein the air regulator further comprises a spoiler.

* * * * *